(12) United States Patent
Hahn et al.

(10) Patent No.: US 9,868,330 B2
(45) Date of Patent: Jan. 16, 2018

(54) LEAF SPRING ASSEMBLY FOR MOTOR VEHICLES

(71) Applicant: Muhr und Bender KG, Attendorn (DE)

(72) Inventors: Christoph Hahn, Attendorn (DE); Rainer Forster, Odenthal (DE); Vladimir Kobelev, Attendorn (DE); David Muller, Lennestadt (DE); Lutz Manke, Hagen (DE)

(73) Assignee: Muhr und Bender KG, Attendorn (DE)

( * ) Notice: Subject to any disclaimer, the term of this patent is extended or adjusted under 35 U.S.C. 154(b) by 0 days.

(21) Appl. No.: 14/905,840

(22) PCT Filed: Jul. 23, 2014

(86) PCT No.: PCT/EP2014/065801
§ 371 (c)(1),
(2) Date: Jan. 18, 2016

(87) PCT Pub. No.: WO2015/011181
PCT Pub. Date: Jan. 29, 2015

(65) Prior Publication Data
US 2016/0159181 A1 Jun. 9, 2016

(30) Foreign Application Priority Data

Jul. 23, 2013 (DE) .................. 10 2013 107 889

(51) Int. Cl.
*B60G 11/02* (2006.01)
*B60G 11/04* (2006.01)
(Continued)

(52) U.S. Cl.
CPC .............. *B60G 11/04* (2013.01); *B60G 11/12* (2013.01); *F16F 1/3686* (2013.01);
(Continued)

(58) Field of Classification Search
CPC .... F16F 1/185; F16F 2224/0241; B60G 7/04; B60G 11/02; B60G 11/04; B60G 11/107; B60G 2202/112; B60G 2206/408
(Continued)

(56) References Cited

U.S. PATENT DOCUMENTS 1,182,181 A 5/1916 Laycock
3,022,991 A 2/1962 Billard
(Continued)

FOREIGN PATENT DOCUMENTS

DE 898154 A1 11/1953
DE 3613804 C1 7/1987
(Continued)

OTHER PUBLICATIONS

International Search Report and Written Opinion for PCT/EP2014/065801 dated Oct. 30, 2014 (with English translation; 16 pages).
(Continued)

*Primary Examiner* — Christopher P Schwartz
(74) *Attorney, Agent, or Firm* — Bejin Bieneman PLC

(57) ABSTRACT

A leaf spring assembly for a wheel suspension of a motor vehicle comprises a leaf spring of fibre-reinforced plastics for resiliently supporting a wheel carrier of the motor vehicle. The leaf spring comprises a first end portion, a spring portion, a bendable portion and a second end portion. The leaf spring further comprises a first receiving device for supporting the first end portion and a second receiving device for supporting a second end portion. The first receiving device and the second receiving device are designed such that the first end portion and the second end portion are held in a non-displaceable way relative to one another. At least one of the first and second receiving devices are designed such that the respective associated end portion is supported in a moment-free way in the receiving device.

18 Claims, 6 Drawing Sheets

(51) Int. Cl.
*F16F 1/368* (2006.01)
*B60G 11/12* (2006.01)

(52) U.S. Cl.
CPC .. *B60G 2202/112* (2013.01); *B60G 2206/428* (2013.01); *B60G 2206/7101* (2013.01)

(58) Field of Classification Search
USPC ........ 267/25, 36.1, 40, 43–47, 53, 260, 261; 280/124.11, 124.17–124.175
See application file for complete search history.

(56) References Cited

U.S. PATENT DOCUMENTS

| | | | |
|---|---|---|---|
| 3,685,812 A | 8/1972 | Buchesky et al. | |
| 4,512,559 A * | 4/1985 | Aoyama | B60G 11/113 267/158 |
| 4,637,594 A * | 1/1987 | Saito | F16F 1/185 267/158 |
| 4,802,659 A | 2/1989 | Hope | |
| 4,969,633 A * | 11/1990 | Ryan | B29C 33/005 267/149 |
| 5,161,785 A * | 11/1992 | Ingvarsson | B60G 11/04 267/45 |
| 5,351,986 A * | 10/1994 | Hedenberg | B60G 11/465 267/31 |
| 6,361,026 B2 * | 3/2002 | Reast | 267/47 |
| 6,428,025 B1 | 8/2002 | Suh | |
| 6,435,485 B1 * | 8/2002 | Greco | F16F 1/185 267/148 |
| 2002/0101012 A1 | 8/2002 | Greco | |
| 2003/0080527 A1 | 5/2003 | Bryant | |
| 2005/0051933 A1 * | 3/2005 | Platner | B60G 7/04 267/38 |
| 2006/0103103 A1 * | 5/2006 | Land | B60G 7/02 280/124.163 |
| 2008/0252033 A1 | 10/2008 | Platner et al. | |
| 2013/0049271 A1 * | 2/2013 | Schurmann | B60G 11/10 267/47 |
| 2013/0127133 A1 | 5/2013 | Enomoto et al. | |

FOREIGN PATENT DOCUMENTS

| | | |
|---|---|---|
| DE | 3637281 A1 | 1/1988 |
| DE | 4411286 C2 | 8/1999 |
| DE | 10202114 A1 | 9/2002 |
| DE | 102009015662 B3 | 10/2010 |
| DE | 10 2009 032919 A1 | 2/2011 |
| DE | 10 2010 015951 A1 | 9/2011 |
| EP | 0425880 A1 | 5/1991 |
| EP | 0752934 B1 | 7/2000 |
| EP | 2570694 A1 | 3/2013 |
| JP | S62-258804 A | 11/1987 |
| JP | H03-19626 A | 4/1991 |
| JP | 2002-059725 A | 2/2002 |
| JP | 2004-306805 A | 11/2004 |
| JP | 2012-051403 A | 3/2012 |
| WO | 9003281 A1 | 4/1990 |

OTHER PUBLICATIONS

SAE, AE-11 Spring Design Manual, Jan. 1, 1990, Chapter 6, Society of Automotive Engineers, Inc., Warrendale, PA (US).

* cited by examiner

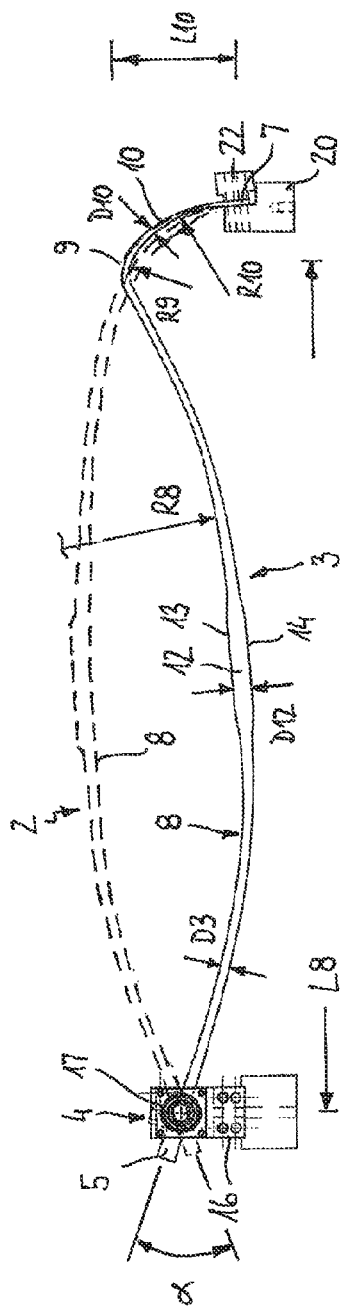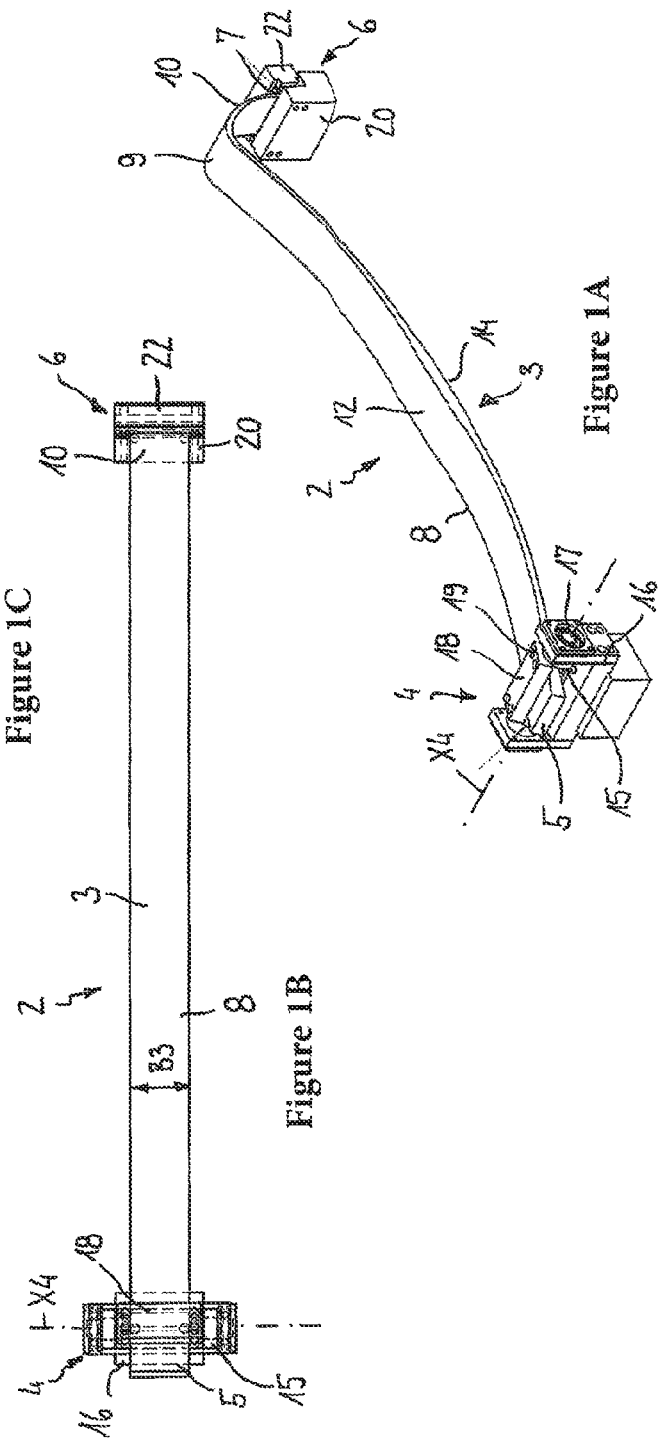

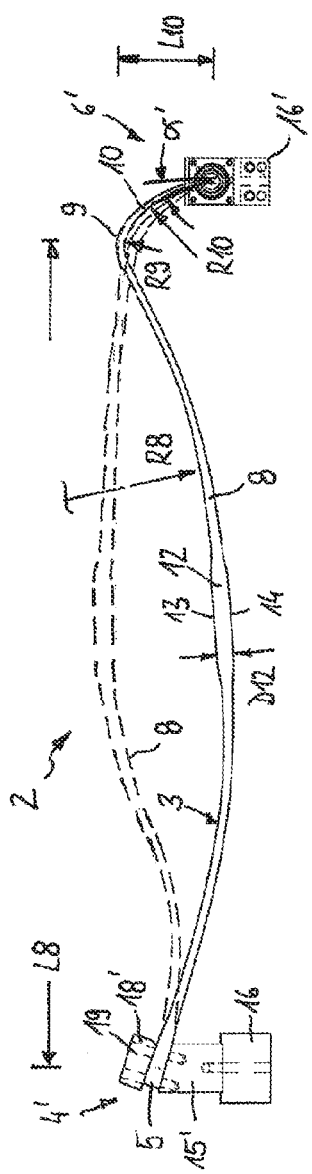
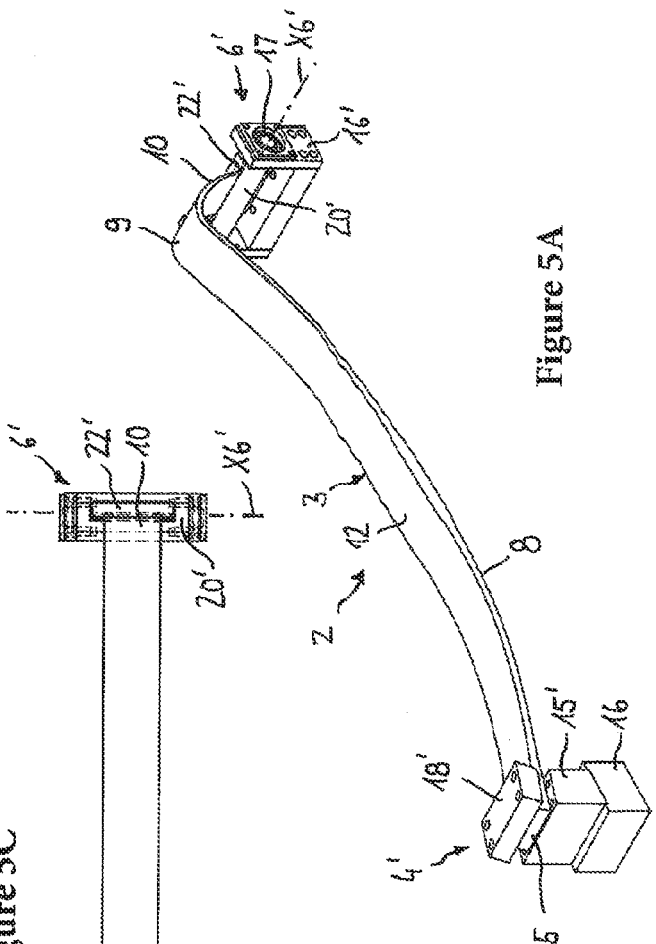
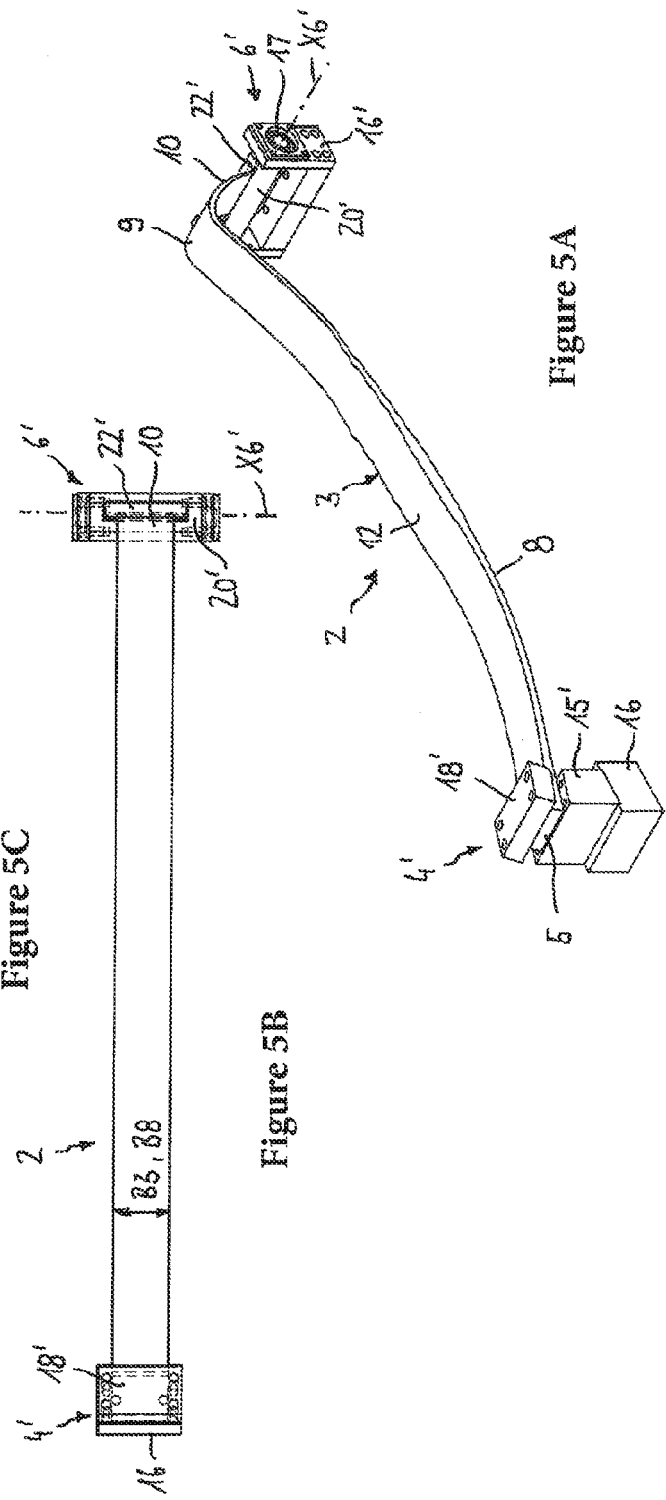
Figure 5C
Figure 5B
Figure 5A

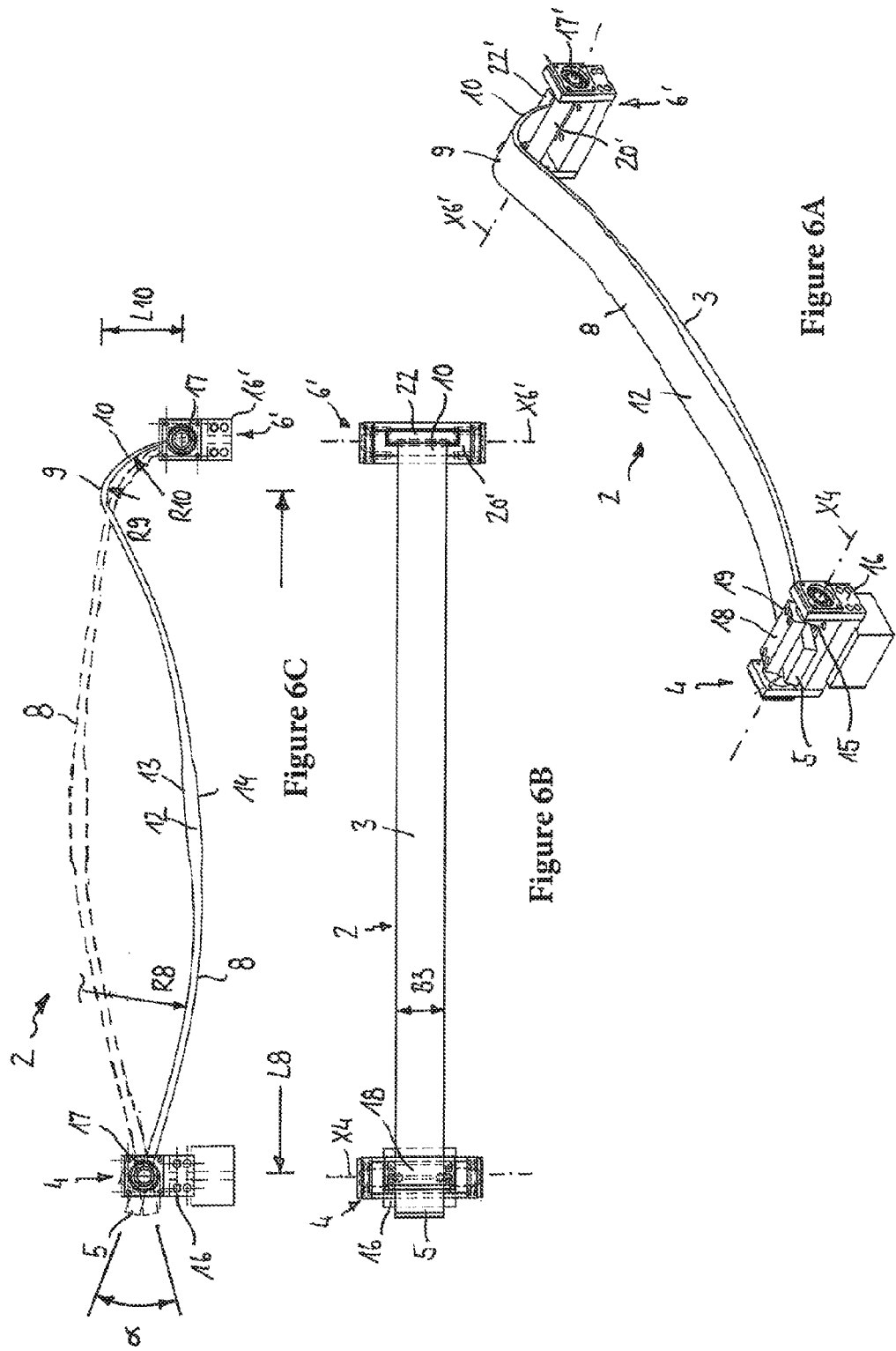

LEAF SPRING ASSEMBLY FOR MOTOR VEHICLES

CROSS-REFERENCE TO RELATED APPLICATIONS

This application is a national stage of, and claims priority to, Patent Cooperation Treaty Application No. PCT/EP2014/065801, filed on Jul. 23, 2014, which claims priority to German Application No. DE 10 2013 107 889.3 filed on Jul. 23, 2013, each of which applications are hereby incorporated herein by reference in their entireties.

BACKGROUND

From DE 10 201 0 015 951 A1 there is known a leaf spring for motor vehicles which is produced from fibre-reinforced plastics. The leaf spring shall accommodate any lateral guiding forces and transfer those to a leaf spring receiving device. The leaf spring comprises a bending joint portion and a spring portion, wherein the bending joint portion is able to compensate for a change in length of the spring portion. Both ends of the leaf spring are fixed in the leaf spring receiving device in a moment-resistant and non-displaceable way.

From DE 102 02 114 A1 a fiberglass composite monoleaf bow spring for use in a vehicle chassis system is known. The ends of the bow spring are connected to the vehicle frame by pinned end attachments and in the middle secured to an axle. The bow spring has a curved form which is symmetric around a central vertical axis. The spring comprises a central upwardly curved region which is arranged between two downwardly curved regions that are arranged between two more upwardly curved regions. The bow spring is compressed under load, i.e. subjected to pressure loads.

U.S. 2008/0252033 A1 proposes a leaf spring for a wheel suspension of a motor vehicle. The leaf spring is produced from fibre-reinforced plastics and, at its ends, it is connected to resilient members which, in turn, are fixed to the chassis of the motor vehicle. In one embodiment, the ends are bent upwardly and are each supported in a resilient bush so as to be pivotable around a longitudinal axis of the motor vehicle.

From DE 10 2009 032 919 A1 there is known a spring assembly with a leaf spring made from a fibre composite material. The leaf spring comprises a central portion and two adjoining end portions which are each received in a bearing block. For changing the spring characteristic, one of the bearing blocks is provided with supporting means against which the leaf spring can rest when under load.

DE 898 154 A1 proposes a suspension system for rail vehicles with a leaf spring. An end of the leaf spring is provided with an eye via which it is supported on the undercarriage. With an increasing bending rate, the spring ends of the leaf spring are supported on resilient supports.

From DE 36 37 281 A1 a spring block is known which is fixed to the frame of a chassis. A leaf spring made of plastics is provided which, at one end, comprises a bearing eye and which, at its other end, is vertically supported relative to the spring block.

From DE 2009 015 662 B3 there is known a spring assembly with a leaf spring for a motor vehicle. The leaf spring is produced from a fibre composite material and, at one end, it is held in a clamping member. The clamping member is pivotably fixed at the bearing block of the motor vehicle. There is provided a stop at the bearing block against which the clamping member can be supported.

From DE 36 13 804 C1 a device is known comprising a leaf spring made of fibre-reinforced plastics and an end sided force introduction part. The leaf spring has a wedge-shaped end portion that is form-fittingly clamped into the force introduction part.

SUMMARY

This disclosure addresses the need for a leaf spring assembly for motor vehicles which is easy to produce and can easily be mounted and which, when under load, comprises a progressive spring rate.

Disclosed herein is a leaf spring assembly for a wheel suspension of a motor vehicle, wherein the leaf spring assembly comprises a leaf spring, a first receiving device for supporting a first spring end and a second receiving device for supporting a second spring end.

Accordingly, disclosed herein is a leaf spring assembly for a wheel suspension of a motor vehicle, comprising: a leaf spring of fibre-reinforced plastics for resiliently supporting a wheel carrier of the motor vehicle, wherein the leaf spring comprises a first end portion, a spring portion, a bendable portion and a second end portion; a first receiving device for supporting the first end portion; a second receiving device for supporting a second end portion; wherein the first receiving device and the second receiving device are designed such that the first end portion and the second end portion are held substantially in a non-displaceable way relative to one another; wherein at least one of the first and second receiving devices are designed such that the respective associated end portion is pivotably supported around a pivot axis extending transversely to the longitudinal axis of the vehicle. The leaf spring is configured such that, at least when higher vertical forces are introduced from the wheel carrier, the leaf spring is subjected to tensile loads, and therefore it can also be referred to as leaf tensile spring. This applies for at least a part of the entire spring travel that is possible.

The advantage of the leaf spring assembly is that, because the end portions are fixed in a non-displaceable way, the leaf spring is subjected to bending and tensile processes. The tensile and bending stresses occurring in the spring are superimposed on one another and, together, lead to a progressive spring characteristic. The tensile forces are generated in the leaf spring in that the end portions of same are each fixed in a non-displaceable way in the respective receiving devices. "Non-displaceable" in this context means that the end portions are fixedly clamped in in the longitudinal direction of the motor vehicle, so that they cannot substantially be displaced in the longitudinal direction when the spring is under load. It is understood that a small degree of displaceability which, for example, may occur more particularly at a pivotable receiving device due to a load-related elastic deformation, is meant to be included. Said slight degree of displaceability can amount to up to 20 mm, preferably up to 10 mm, at each receiving device. Because the leaf spring ends are received in a substantially non-displaceable way, the tensile stress increases progressively with an increasing load, so that the spring rate of same also increases progressively. In the installed state, this means that with an increasing load on the motor vehicle, the suspension becomes stiffer, which has an advantageous effect on the driving comfort and driving stability of the motor vehicle.

The stresses generated in the spring portion and the bendable portion, respectively, change with an increasing load and differ from each other with regard to their single stress components. With vertical forces introduced by the wheel carrier, the spring portion is particularly subjected to tensile load and the bendable portion, with the spring portion being under tensile load, is particularly subjected to bending. In this context "particularly" or "substantially" shall also cover that at any given load condition further load components, respectively stress components, can be generated in the respective portion of the spring and, respectively, that the single stress components vary with changing load.

"At least one of the receiving devices" means that according to a first possibility only one of the first and second receiving devices is designed as a pivotable and moment-free bearing for the associated spring end, whereas the respective other receiving device is provided in the form of a stiff and moment-resistant bearing. Pivotability leads to moment-free conditions around the pivot axis, so that in the present disclosure the terms of "pivotable" and "moment-free" are used synonymous. A moment-resistant bearing is not pivotable and, in the present disclosure, is therefore referred to as "stiff". Associating a pivotable (moment-free) and a stiff (moment-resistant) bearing with the spring portion and, respectively, the bendable portion, can be freely selected depending on the requirement to be met by the spring behaviour. According to a second possibility, it is also possible for both receiving devices to be provided in the form of moment-free bearings.

A moment-free bearing leads to reduced forces at the receiving device between the spring and the receiving device. The moment-free bearing is achieved more particularly in that the associated end portion is supported so as to be pivotable around a pivot axis in the receiving device and, respectively, relative to a stationary component. The pivot axis can extend at least substantially transversely to the longitudinal vehicle axis, wherein angular deviations of ±10° relative to a normal of the longitudinal vehicle axis shall be included. The pivot bearing can be designed such that rotational movements of the pivotably received spring end up to a minimum of 10° and/or up to a maximum of 60°, preferably by a rotational angle of 25° to 45° around the pivot axis, are possible.

According to an example spring, the suspension portion is provided in the form of a first spring leg and the bendable portion in the form of a second spring leg of the leaf spring, wherein the first and the spring legs can differ from one another in respect of length and/or curvature. In the installed state, i.e., when installed in a vehicle, of the leaf spring, a wheel carrier is fixed at the spring portion, via which wheel carrier the forces of the vehicle wheel are introduced into the leaf spring. Thus, in a mounted state the spring portion preferably extends substantially in the longitudinal direction of the motor vehicle, and respectively, horizontally. The bendable portion, when the leaf-spring is installed in the vehicle, preferably has a main direction of extension in vertical direction. The vertical forces introduced by the wheel carrier into the spring portion lead to a tensile load in the spring portion which, in turn, causes the bendable portion to bend towards the spring end remote from the bendable portion.

By constructively designing the spring portion and the bendable portion in respect of physical parameters such as cross-sectional area, length or width, the suspension behaviour and, respectively, the progression of the leaf spring can be set. Thereby it applies that the longer the bendable portion and the smaller the cross-sectional area, the softer the spring, and vice versa: the shorter or thicker the bendable portion, the stiffer the spring.

In an example, the spring portion comprises a lower convex curvature in the unloaded installed state of the spring. "Unloaded installed state" means in particular that no forces are applied to the leaf spring. However, it is provided that the spring portion has a lower concave curvature in a loaded installed state of the leaf spring at a maximum spring deflection. In other words, upon increasing load a change in curvature of the spring portion from convex to concave takes place, wherein a neutral position is traversed between these two positions. At initial loading, wherein the spring portion lower side is convex, in particular bending stresses and compressive stresses are present. With increasing load the lower convex curvature is flattened, wherein the compressive stresses in the spring portion initially increase, then decrease again and eventually become zero. The position in which the spring portion is substantially free from compressive and tensile stresses defines a neutral position. The leaf spring can be designed such that the neutral position is present in a mounted ready-to-deflect load condition, i.e. with a stationary unladen or slightly laden vehicle. At increasing load, i.e. in a laden condition or under dynamic spring deflection, the leaf spring is further deformed elastically, wherein the spring portion is increasingly tension loaded. In other words, the leaf spring can be designed such that the spring portion, in case of elastic deformation due to vertical forces introduced from the wheel carrier, is pressure loaded in a first spring travel range and, upon increasing load and thus increasing elastic deformation, is tensile loaded in a second spring travel range.

The bendable portion can comprise a lower concave curvature in the installed state of the spring. Between the spring portion and the bendable portion a curved connecting portion can be provided whose radius is smaller than a radius of the bendable portion and/or smaller than a radius of the spring portion.

According to an example, the spring portion is longer than the bendable portion, with the ratio between the suspension portion and the bendable portion, more particularly, being greater than 3:1, more particularly greater than 4:1 or even greater than 5:1. According to a possible example, the ratio between the spring portion and the bendable portion is in particular smaller than 10:1, more particularly smaller than 9:1 or even smaller than 8:1, wherein it is understood that said upper and lower values can be combined with each other arbitrarily.

The association of the longer spring leg, respectively the shorter spring leg, relative to the moment-free and, respectively, moment-resistant receiving device, can be freely selected as a function of the required spring behaviour. If the long spring leg is supported in a moment-resistant way and if the short spring leg is supported in a moment-free way, there is achieved a relatively high spring rate and a high spring force. Vice versa, i.e., if the long spring leg is supported in a moment-free way and if the short spring leg is supported in a moment-resistant way, the spring rate and the spring forces will be reduced by a multiple. The lowest spring rate and spring forces occur if both ends of the leaf spring are supported in a moment-free way.

It is possible that one or more further spring legs can be provided in addition to the first spring leg that is configured as spring portion and the second spring leg that is configured as a bendable portion. More particularly, it can be proposed that at both ends of the spring portion a respective bendable portion is attached. However, at least one bendable portion is provided with which the tensile stresses acting on the spring portion under load conditions can be set.

The at least one receiving device with the associated spring end being supported in a moment-free way can comprise a stop which limits a pivot movement of the leaf spring around the pivot axis. If moment-free bearings are used at both ends of the leaf spring, the first and/or the second receiving device can, accordingly, be provided with a limit stop. By suitably designing the stop, it is possible to influence the springing behaviour of the leaf spring. This is due the fact that, if the leaf spring comes to stop and thus the pivot moment of the leaf spring is limited, the spring force increases which leads to an increasing progression of the spring rate. In an example, the limit stop can be variably set, so that the characteristic force-travel-curve is easy to vary or set.

To achieve a simple production process and a high strength, it is proposed more particularly that the first end portion and/or the second end portion remain unmachined, more particularly bore-free. To ensure that the spring ends are securely received in the receiving devices, even under high loads, it is advantageous if the first end portion and/or the second end portion are/is wedge-shaped, with the thickness increasing towards the ends. In this way, the leaf spring is prevented from slipping out of the receiving device.

The spring portion preferably comprises a central receiving region for accommodating the wheel carrier, with the central receiving region more particularly having a greater thickness than adjoining regions of the spring portion. The greater thickness ensures that the stresses in the receiving region which, at the same time, forms the region of force introduction from the wheel carrier, are kept low. The receiving region comprises more particularly a planar upper side and/or planar underside which can extend parallel relative to one another. This ensures good force introduction conditions of a carrier part to be connected to the leaf spring for the vehicle wheel. Said planar receiving region can comprise a length of approximately 150 mm to 200 mm.

According to an example embodiment, the leaf spring is produced in one piece. The leaf spring can be produced for example by resin transfer moulding (RTM) or by pressing. By producing the leaf spring in one piece, it is possible to avoid a reduction in the mechanical strength in joins and the like. More particularly, the spring can be produced out of uni-directional, pre-impregnated fibres, so-called pre-pregs, with a duroplastic or thermoplastic matrix in a pressing process. In this way, it is easy to provide the leaf spring with the required shape in the unloaded condition.

The receiving device for providing a moment-free support can comprise a receiving member which, relative to a fixed component, is supported so as to be pivotable around the pivot axis, as well as a clamping member which can be releasably connected to the receiving member, wherein the end portion of the leaf spring can be clamped in between the receiving member and the clamping member. The releasable connection between the receiving member and the clamping member can be achieved by any suitable connectors, for example by bolted connections.

A receiving device for providing a moment-resistant support can comprise a receiving member which is attached to a fixed component, as well as a clamping member which is releasably connectable to the receiving member, wherein the end portion of the spring can be clamped in between the receiving member and the clamping member. The receiving member is held in a displacement-free and rotationally fixed way at the stationary component, for example a chassis part of the motor vehicle, so that any bending moments acting around a transverse axis of the motor vehicle can be introduced from the leaf spring into the receiving device.

According to one example, at least one of the spring portion and the bendable portion comprises a variable thickness along the length. As an alternative or in addition hereto, at least one of the spring portion and the bendable portion can comprise a substantially constant width along the length. "Substantially constant" shall include certain tolerance deviations of in particular up to ±5%. According to a further possible embodiment, the cross-sectional face of the leaf spring can be substantially constant along the length, whereas the thickness along the height can be variable. More particularly, the thickness of the leaf spring can be increased in the region of the wheel carrier receiving device or the end portions of the leaf spring. As a result of the constant cross-sectional face it is ensured that the leaf spring fibres extend uniformly along the length, which leads to a high strength. However, it is also possible that the cross-sectional area is variable along the length of the leaf spring, which could be achieved for instance by providing additional layers of pre-pregs in the regions concerned.

Preferred embodiments of the invention will be explained below with reference to the drawing figures wherein FIG. 1A shows a leaf spring assembly for a wheel suspension of a motor vehicle in a first example in a three-dimensional view;

FIG. 1B shows the leaf spring assembly of FIG. 1A in a plan view;

FIG. 1C shows the leaf spring assembly of FIG. 1A in a side view;

FIG. 3B shows the leaf spring assembly of FIG. 3A in a plan view;

FIG. 3C shows the leaf spring assembly of FIG. 3A in a side view;

FIG. 3D shows the leaf spring assembly of FIG. 3A with the first bearing in a stress-relieved condition;

FIG. 3E shows the leaf spring assembly of FIG. 3A with the first bearing in a first stopped position and;

FIG. 3F shows the leaf spring assembly of FIG. 3A with the first bearing in a second stopped position;

FIG. 5 shows a third example of a leaf spring assembly for a wheel suspension of a motor vehicle in a three-dimensional view;

FIG. 5B shows the leaf spring assembly of FIG. 5A in a plan view;

FIG. 5C shows the leaf spring assembly of FIG. 5A in a side view;

FIG. 6 shows a fourth example of a leaf spring assembly for a wheel suspension of a motor vehicle in a three-dimensional view;

FIG. 6B shows the leaf spring assembly of FIG. 6A in a plan view; and

FIG. 6C shows the leaf spring assembly of FIG. 6A in a side view.

Figure 2:
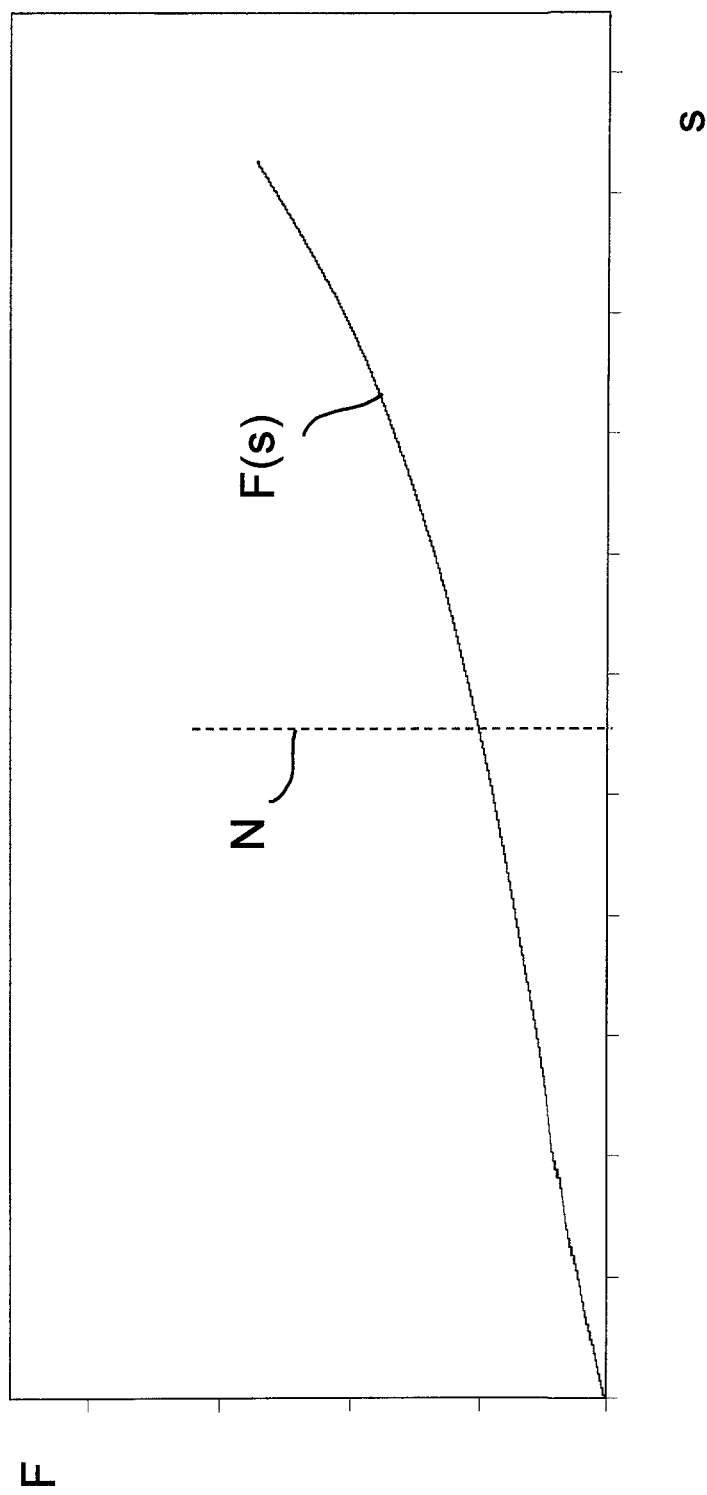
FIG. 2 shows characteristic load displacement curves of the leaf spring assembly according to FIG. 1.
Figure 3:
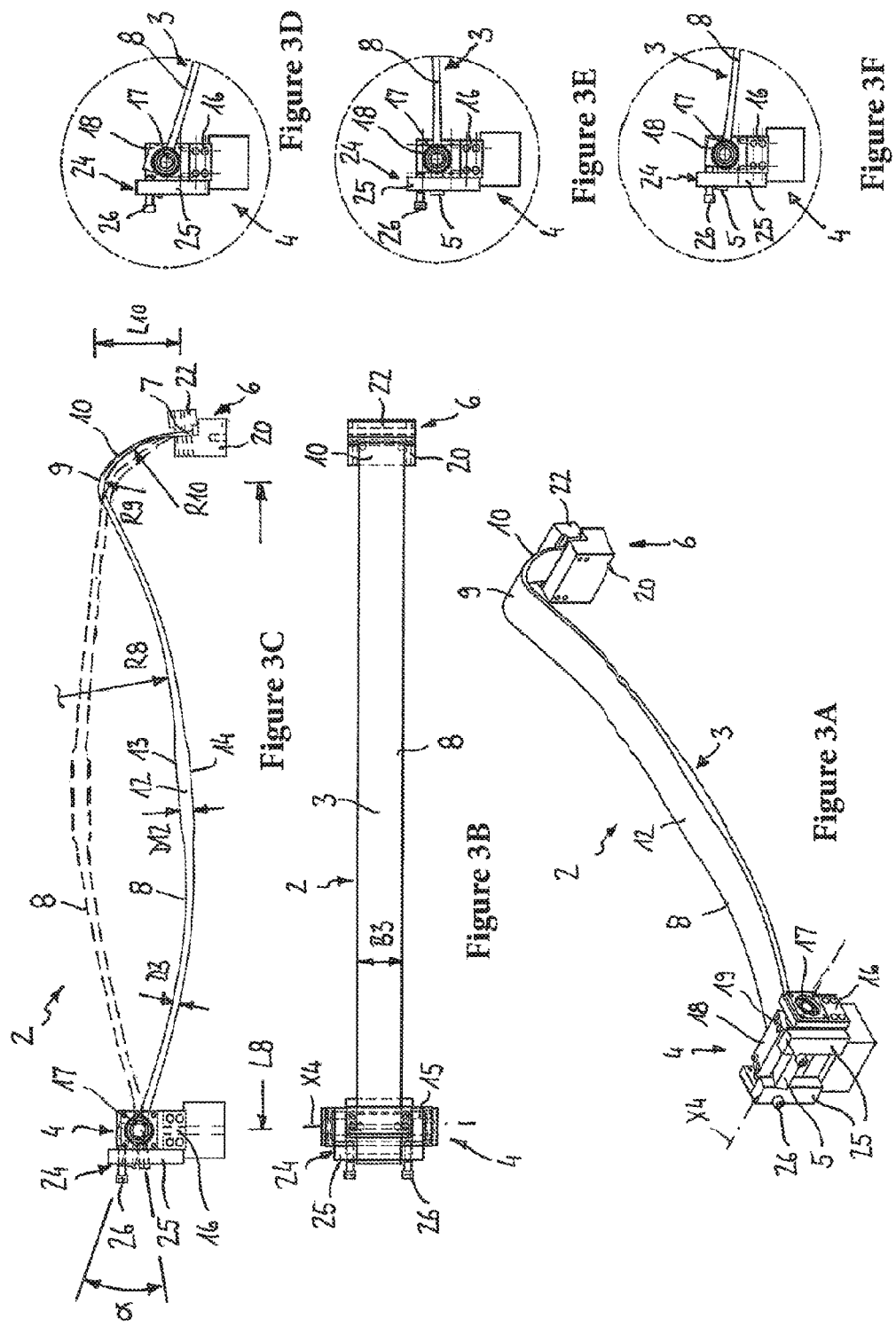
FIG. 3 shows a second example of a leaf spring assembly for a wheel suspension of a motor vehicle in a three-dimensional view.

Below, FIGS. 1A to 10 will be described jointly. They show a leaf spring assembly 2 in a first example. The leaf spring assembly 2 comprises a leaf spring 3 made of fibre-reinforced plastics for resiliently supporting a wheel carrier of a motor vehicle, a first receiving device 4 for supporting a first end portion 5 of the leaf spring 3 and a second receiving device 6 for supporting the second end portion 7 of the leaf spring.

Starting from the first end 5, the leaf spring 3 comprises a first spring leg 8 and a second spring leg 10, with the two spring legs 8, 10 being connected to one another by a transition portion 9. The second spring leg 10 ends with a second end portion 7 which is fixed in the second receiving device 6. The first spring leg 8 serves to receive a wheel carrier, not illustrated, to which a vehicle wheel is fixed. For this purpose, the first spring leg 8 comprises a central receiving region 12 which comprises a thickness D12 which is greater than that of the laterally adjoining regions. The upper side 13 and the underside 14 of the receiving region 12 comprise planar faces which, more particularly, extend parallel relative to one another. As a result of said planar faces, the mounting procedure is easy and there is ensured a uniform introduction of force from the wheel carrier into the leaf spring 3. The receiving region 12 can comprise a length of 150 mm to 200 mm, for example.

In the mounted condition, the main direction of extension of the first spring leg 8 is in the longitudinal direction of the motor vehicle and, respectively, in the horizontal direction, whereas the main direction of extension of the second spring leg 10 is in the vertical direction of the motor vehicle. In the mounted condition, the first end 5 can point in the direction of driving (forward), whereas the second end 7 is positioned at the rear end and, more particularly, points downwardly. When the leaf spring assembly is under load, the first spring leg 8 is deflected and thus forms a spring portion. When the leaf spring 3 is under load, the second spring leg 10 bends and thus forms a bendable portion. After exceeding of the neutral position of the leaf spring, the vertical forces introduced from the wheel carrier into the spring portion 10 lead to a tensile load in the spring portion, which causes the bendable portion to bend towards the end portion 5 which is remote from the bendable portion. Until the neutral state of the spring is reached, in particular bending stresses and compressive stresses are present in the spring portion 8.

The first and the second spring leg 8, 10 can differ from one another in respect of their length and/or their curvature. In the present example, the length of the spring portion 8 is greater, by a multiple, than that of the bendable portion 10, with the ratio of the length of the spring portion relative to the length of the bendable portion preferably being greater than five and smaller than ten. Furthermore, it can be seen that the spring portion 8, in the unloaded installed state, which is shown with dashed line, comprises a lower convex curve and, respectively, an upper concave curvature, more particularly with a mean radius of curvature R8. With the spring being loaded due to vertical forces introduced, the spring portion is acted upon upwardly, whereby initially bending and compressive stresses are generated up to reaching a neutral position in which the spring portion is substantially straight. When the neutral position is exceeded the curvature of the spring portion 8 changes, i.e. it gets a lower concave and upper convex curvature. With exceeding the neutral position the bending stresses in the spring portion 8 are superimposed by tensile stresses. Thereby, the tensile stresses increase with an increasing load and thus increasing elastic deformation of the leaf spring 3 which leads to a progressive spring characteristic. The loaded mounted condition at maximum deflection is drawn in with dashed lines. It can be seen that the spring portion 8 is clearly curved upwards and that the bendable portion 10 is bent towards the first receiving device 4.

The first spring leg 8, via the transition portion 9, changes into the second spring leg 10, with the second spring leg 10 comprising a lower concave and, respectively, an upper convex curvature. Thus, a change in curvature of the leaf spring extension takes place in the transition portion 9. By configuring the first spring leg 8, which is also referred to as the spring portion, the transition portion 9, and the second spring leg, which is also referred to as the bendable portion, it is possible to set the springing behaviour and thus the progression of the leaf spring 3 when under load. In this instance, it is generally the case that the longer the bendable portion 10, the stiffer the spring. In the present example, the radius R8 of the spring portion 8 is greater, by a multiple, than the radius R9 of the transition portion 9 and greater than the radius R10 of the bendable portion 10.

The first receiving device 4 is designed such that the first end 5 of the leaf spring 3 is received therein in a non-displaceable and moment-free way. More particularly, it is proposed that the first end 5 is held so as to be substantially stiff in a displacement sense with reference to all three axes (x, y, z). In accordance with the above definition, the non-displaceable bearing is to comprise slight displacements of up to 20 mm, which, for example, can result from an elastic deformation of the receiving device when the spring is under load. The moment-free support is accomplished in that the end portion 5 is supported so as to be pivotable around the pivot axis X4 of the first receiving device 4. In the installed state, the pivot axis X4 extends approximately transversely to the longitudinal vehicle axis, with certain angular deviations being conceivable. More particularly, it is proposed that the spring end 5 is pivotable relative to the receiving device by a minimum of 10° and/or a maximum of 60°, preferably by an angle of rotation of 25° to 45°. Relative to the other two axes (y, z), the spring end 5 is held so as to be substantially stiff in a rotational sense, i.e. it is not pivotable.

The first receiving device 4 comprises a receiving member 15 which, relative to a fixed carrier 16, is supported by suitable bearing means 17 so as to be rotatable around the pivot axis X4; as well as a clamping member 18 which is releasably connectable to the receiving member 15 by bolted connections 19 for example. The first end portion 5 of the leaf spring 3 is wedge-shaped and its thickness increases towards its end. In this way, the end portion 5 is effectively prevented from slipping out of the first receiving device 4, even if the leaf spring is under maximum load. The pivotable, moment-free support of the first end portion of the leaf spring 3, leads to a reduction in forces in the receiving device 4 which are effective between the spring and the receiving device.

The opposed second end portion 7 is received in the second receiving device 6, with the second receiving device 6 forming a moment-resistant and non-displaceable bearing for the second end 7. For this purpose, the second receiving device 6 comprises a receiving member 20 which is to be connected to a stationary component, as well as a clamping member 22 which is releasably connectable to the receiving member 20, for example by bolted connections 23. The second end portion 7 is fixedly clamped in between the clamping member 22 and the receiving member 20, wherein also in this case it is proposed in particular that the leaf spring 3 widens in a wedge-shaped way towards its end. In this way, secure fixing conditions are ensured, even under maximum loads.

Furthermore, it can be seen that the leaf spring 3, along its length, features a substantially constant width B3, whereas the thickness D3 is variable along its length. Locally thickened portions, especially in the region of the end portions 5, 7 or in the central region 12 ensure a reduction in tension. The locally thickened portions can be achieved for example by additional layers of pre-pregs in the respective regions.

The leaf spring 3 can be produced in one piece, for example by a pressing process involving the use of unidirectional, pre-impregnated fibres, so-called pre-pregs with a duroplastic or thermoplastic matrix. Other production processes such as resin injection moulding (RMT) are also possible.

FIG. 2 shows a force path characteristic curve F(s) of the leaf spring assembly 2 according to FIG. 1. The Y-axis shows the force F and, on the X-axis, the displacement s. It can be seen that the force F increases with an increasing spring travel s. With an increasing motor vehicle load and an increasing spring deflection, respectively, said progressive characteristic spring curve leads to a stiffer suspension, which advantageously affects the driving comfort and the driving stability of the motor vehicle.

The neutral position N, in which the spring portion 8 is substantially straight respectively free from compressive and tensile stresses, is shown with dashed line in FIG. 2. In the spring travel range up to reaching the neutral position N, the spring portion is curved convex on the downside. In this area, which is left of the neutral position N, the spring rate F(s) of the lead spring 3 is substantially constant. In particular, bending stresses and compressive stresses are present in the spring portion 8 which are reduced with increasing elastic deformation up to reaching the neutral position N. When exceeding the neutral position N, i.e., upon changing from the lower convex to the lower concave curvature of the spring portion 8, in addition to the bending stresses, tensile stresses are generated which increase with an increasing load so that accordingly the spring rate F(s) of the leaf spring 3 increases progressively. This area is on the right hand side of the neutral position N.

The course of the characteristic force displacement curve F(s) of the leaf spring assembly can be influenced by appropriately designing the leaf spring 3 in respect of its physical characteristics such as the length, width and thickness of the individual leaf spring portions as well as the receiving devices 4, 6. In principle, associating the longer spring leg 8 and the shorter spring leg 10, respectively, to the moment-free receiving device 4 and to the moment-resistant receiving device 6, respectively, is freely selectable. In the example according to FIG. 1 with the moment-free support of the long spring leg 8 and a moment-resistant support of the short spring leg 10 there occur relatively low spring forces in the leaf spring 3 which, accordingly, also feature relatively low spring rates. However, depending on the requirements to be met by the suspension system, it is also possible to select different assemblies which will be referred to below in greater detail.

FIGS. 3A to 3F, which will be described jointly below, show a leaf spring assembly 3 in a second example which largely corresponds to the example according to FIG. 1 so that, as far as common features are concerned, reference is made to the above description. Identical components and components corresponding to one another have been given the same reference numbers as in FIG. 1.

A special design feature of the present example according to FIGS. 3A to 3F is in the design of the first receiving device 4. It is also designed for the purpose of providing a moment-free and displacement-resisting support for the first end portion 5 of the leaf spring 3. In addition to the example according to FIG. 1, in the present example a stop 24 is provided which limits a pivot moment of the receiving member 25, and of the clamping member 18, respectively, in the circumferential direction. The limit stop 24 comprises two plates 25 which are fixedly connected to the carrier 16, for example by threaded connections. At the upper end of the stop plates there are provided threaded bores through which threaded bolts 26 are threaded. The threaded ends of the threaded bolts 26 cooperate with the clamping member 3 in such a way that the clamping member 18, when the leaf spring 3 is under load and pivots around the pivot axis X4, stops against the pins ends. The limit stop 24 has the effect that the generally moment-free support is fixed, so that after the leaf spring 3 has reached the stop, any bending moments acting around the pivot axis X4 are accommodated and supported by the first receiving device 4. Thus, the progression of the characteristic force displacement curve F(s) of the leaf spring assembly 3 is displaced towards shorter distances (s). The limit stop 24 and thus the characteristic force displacement curve F(s) can be steplessly adjusted by rotating the threaded bolt 26, as required.

Figure 4:
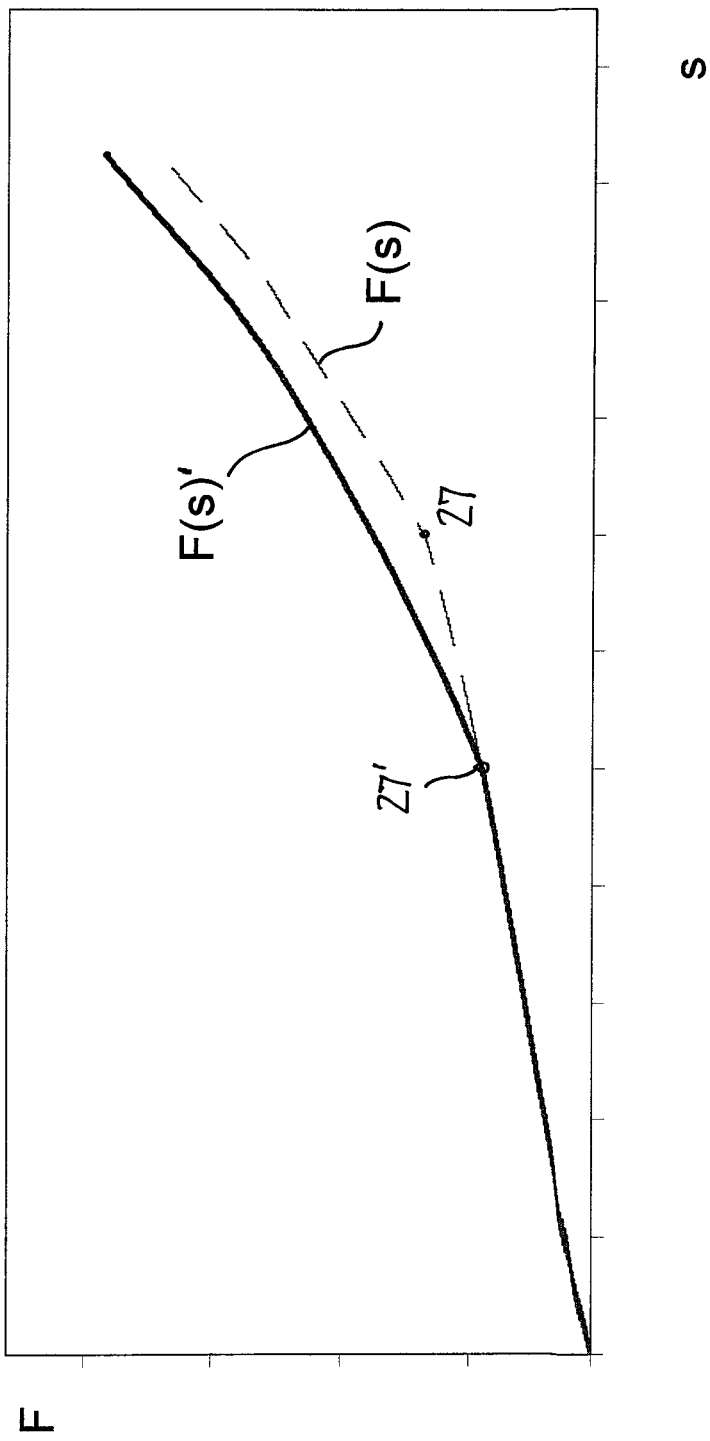
FIG. 4 shows the characteristic load displacement curves of the leaf spring assembly according to FIG. 3A with different stop settings.

FIG. 3D shows the first receiving device 4 in a lateral view as a detail in the unloaded condition of the leaf spring 3. It is possible to see a distance between the clamping member 18 and the end of the threaded bolt 26. FIG. 3E shows the first receiving device 4 in a loaded condition of the leaf spring assembly 3. It can be seen that, because of the load on the leaf spring 3, the first spring leg 8 has been pivoted rotated around the pivot axis X4 anti-clockwise until the clamping member 18 has come to stop against the end of the threaded pin 26. The associated force displacement curve F(s) is shown in FIG. 4 in the form of a dashed line. The kink point 27 is drawn in with which a sudden increase in the spring force F is achieved.

FIG. 3F shows the first receiving device 4 wherein the stop 24 becomes effective at an earlier stage, so that the rotational movement of the spring bearing is already inhibited at a shorter rotational travel. For this purpose, the threaded bolt 26 has been rotated further into the threaded bore of the carrier plate 25, so that the clamping member 18 comes to rest against the stop 24 after a shorter spring travel. The associated characteristic force displacement curve F(s)' is shown in FIG. 4 in the form of a continuous line. It can be seen that already at a short spring travel (s)' the point 27' is reached, from which point onwards a sudden increase in the force F' occurs. Overall, there is thus achieved a steeper force displacement curve F(s)' than in the case of a longer spring travel up to the switch-off point as shown in FIG. 3E.

FIGS. 5A to 5C show a leaf spring assembly 2 in a further example which largely corresponds to the example according to FIG. 1, so that as far as common features are concerned, reference is made to the above description. Therein, identical details and details corresponding to one another have been given the same reference numbers (with indices), as in FIG. 1.

A feature of the present example according to FIG. 5 is that the moment-free and the moment-resistant bearings have been exchanged relative to FIG. 1, which means that the first receiving device 4' forms a displacement-resistant and moment-resistant support for the spring end 5, whereas the second receiving device 6' forms a displacement-resistant and moment-free support for the second spring end. In this case, too, the term "displacement-resistant" may comprise slight displacements of the ends 5, 7 in the longitudinal direction of the motor vehicle with the spring 3 being under load. In the present example, the first end 5—with reference to all three axes (x, y, z)—is held so as to be substantially stiff, both in the displacement sense and in the rotational sense. The second end 7 is held to be movable in the rotational sense with reference to the transverse axis (x) and—with reference to the longitudinal axis and perpendicularly axes (y, z)—it is held so as to be at least substantially stiff in the rotational sense.

The receiving member 15' is fixedly connected to a carrier 16, for instance to a chassis part, with "fixidly" meaning that no relative movements, such as displacement movements or pivot movements can take place between the receiving member 15' and the carrier 16. The end portion 5 of the leaf spring 3 is clamped in between the clamping member 18' and the receiving member 15', with tensioning bolts (not illustrated) being threaded into the respective threaded bores.

The second receiving device 6', in which the second end portion 7 of the leaf spring 3 is supported, is provided in the form of a moment-free bearing. There is provided a pivotable receiving member 20' which is supported by a suitable bearing 17' relative to a stationary carrier element 16' so as to be pivotable around a pivot axis X6'. The wedge-shaped end 7 of the leaf spring 3 is clamped in between the pivotable receiving member 20' and the clamping member 22', so that it is non-displaceable, but rotationally movable in the second receiving device 6'.

By associating the moment-free bearing with the first end portion 5, respectively with the first spring leg 8, a relatively high spring rate and a relatively high spring force is generated, i.e., the associated characteristic load displacement curve F(s) has a steeper progression than in the example according to FIG. 1.

FIGS. 6A to 6C, which will be described jointly below, show a leaf spring assembly 2 in a further example which corresponds to a combination of the example according to FIG. 1 and according to FIG. 5, so that, as far as common features are concerned, reference is made to the above description. Thereby, identical details and details corresponding to one another have been given the same reference numbers as in FIGS. 1 to 5.

The special feature of the present example according to FIG. 6 is that the first receiving device 4 and the second receiving device 6' both form moment-free bearings. For this purpose, the first receiving device 4 for clamping in the end 5 of the first spring leg 8 is supported so as to be pivotable around the pivot axis X4. The opposed second end 7 of the second spring leg 10, accordingly, is supported in the receiving device 6 so as to be pivotable around the pivot axis X6. At both spring ends 5, 7, there should preferably be a pivotability of a minimum of 10° and/or a maximum of 60° relative to the associated receiving device, preferably of 25° to 45°. The two ends 5, 7 of the leaf spring 3 are each non-displaceably clamped into the two receiving devices 4, 6' in the longitudinal direction, and in this case, too, the above definition of a "non-displaceable bearing" applies. To achieve a non-displaceable support, the wedge-shaped ends 5, 7 are each fixed between the receiving member 15, 20' and the clamping member 18, 22'.

By supporting the two spring ends 5, 7 in a moment-free way in accordance with the present example, there are generated particularly low spring rates and spring forces, i.e. the characteristic force displacement curve F(s) of the leaf spring assembly 2 has a particularly flat course.

It applies to all the above-mentioned examples that in the installed state the first end 5 and, respectively, the long spring leg 8 are positioned in the front of the vehicle, and accordingly that the second end 7 and, respectively, the second receiving device 6 are positioned at the rear. A reversed arrangement is also possible.

An advantage of the leaf spring assembly 2 is that, due to the end portions 5, 7 being fixed in a non-displaceable way, the leaf spring 3 can be subjected to both bending and tensioning loads. The tensile and bending stresses occurring in the spring 3 are superimposed on one another and, together, lead to a progressive characteristic spring curve F(s). The tensile forces are generated in that the end portions 5, 7 are axially fixedly clamped in in the longitudinal direction. When the spring 3 is subjected to load, said end portions 5, 7, as a result, cannot move towards one another, which leads to a progressive characteristic spring curve. The moment-free support of at least one of the end portions 5, 7 leads to reduced stresses in the leaf spring, as compared to a moment-resistant support.

The invention claimed is:

1. A leaf spring assembly for a wheel suspension of a motor vehicle, comprising:
   a leaf spring of fiber-reinforced plastics for resiliently supporting a wheel carrier of the motor vehicle, the leaf spring comprising a first end portion, a spring portion extending from the first end portion, a second end portion, a bendable portion extending from the second end portion, wherein the spring portion extends substantially in a longitudinal direction of the motor vehicle in an installed state and is configured to accommodate the wheel carrier, wherein the spring portion and the bendable portion are connected to each other by a curved transition portion and wherein the spring portion is longer than the bendable portion;
   a first receiving device for supporting the first end portion;
   a second receiving device for supporting the second end portion;
   wherein the first receiving device and the second receiving device are provided so as to hold the first end portion and the second end portion in a non-displaceable way relative to one another, wherein the leaf spring, with an increasing load due to vertical forces introduced from the wheel carrier, is increasingly subjected to tensile loading;
   further wherein at least one of the first and second receiving devices provides pivotable support to the associated one of the first end portion and the second end portion around a pivot axis extending transversely to a longitudinal axis of the vehicle;
   and further wherein in the installed state of the leaf spring the first end portion and the spring portion extending therefrom are positioned towards a front end of the motor vehicle, and the second end portion and the bendable portion extending therefrom are positioned towards a rear end of the motor vehicle.

2. The leaf spring assembly of claim 1, wherein a ratio of a length of the spring portion to a length of the bendable portion is greater than 3:1 and smaller than 10:1.

3. The leaf spring assembly of claim 2, wherein the spring portion comprises a variable thickness and a substantially constant width along the length of the spring portion.

4. The leaf spring assembly of claim 1, wherein the spring portion comprises a central receiving region to receive the wheel carrier, wherein the central receiving region has a greater thickness than adjoining regions of the spring portion.

5. The leaf spring assembly of claim 1, wherein the receiving region comprises a planar upper side and a planar underside, wherein the planer upper side and the planar underside of the receiving region extend parallel relative to one another.

6. The leaf spring assembly of claim 1, wherein one of the first and second receiving devices provides support to the associated one of the first and second end portion in a moment-resistant way.

7. The leaf spring assembly of claim 6, wherein, to ensure moment-resistant support, said one of the first and second receiving devices comprises a receiving member which is fixed to a stationary component, and a clamping member which is releasably connectable to the receiving member, wherein the end portion of the leaf spring can be clamped in between the receiving member and the clamping member.

8. The leaf spring assembly of claim 1, wherein at least one of the first receiving device and the second receiving device is configured to allow the associated end portion to be pivotable by at least one of a minimum of up to 10° and a maximum of up to 60° around the pivot axis.

9. The leaf spring assembly of claim 1, wherein at least one of the first receiving device and the second receiving device comprises a stop which limits a pivot movement of the leaf spring around the pivot axis.

10. The leaf spring assembly of claim 1, wherein the leaf spring is designed such that the spring portion, upon elastic deformation due to vertical forces introduced from the wheel carrier, is subjected to pressure loading in a first spring travel range and is subjected to tensile loading in a second spring travel range.

11. The leaf spring assembly of claim 1, wherein the spring portion comprises a lower convex curvature in the installed state of the leaf spring, and a lower concave curvature in a loaded installed state of the leaf spring at a maximum spring deflection.

12. The leaf spring assembly of claim 1, wherein the spring portion is substantially free of tensile and compressive stresses in a partly loaded installed state of the leaf spring.

13. The leaf spring assembly of claim 1, wherein the bendable portion comprises a lower concave curvature in the installed state of the leaf spring.

14. The leaf spring assembly of claim 1, wherein a radius of the transition portion is smaller than a radius of the bendable portion and smaller than a radius of the spring portion.

15. The leaf spring assembly of claim 1, wherein at least one of the first end portion and the second end portion is unmachined.

16. The leaf spring assembly of claim 1, wherein at least one of the first end portion and the second end portion is wedge-shaped with a thickness increasing towards an end.

17. The leaf spring assembly of claim 1, wherein the leaf spring is produced by resin transfer moulding or by pressing.

18. The leaf spring assembly of claim 1, wherein, to ensure a moment-free support, at least one of the first receiving device and the second receiving device comprises a receiving member which is pivotably supported relative to a stationary component around the pivot axis, as well as a clamping member which is releasably connectable to the receiving member, wherein the first end portion of the leaf spring can be clamped in between the receiving member and the clamping member.

* * * * *

(12) INTER PARTES REVIEW CERTIFICATE (4110th)
United States Patent (10) Number: US 9,868,330 K1
Hahn et al. (45) Certificate Issued: Sep. 4, 2025

(54) LEAF SPRING ASSEMBLY FOR MOTOR VEHICLES

(71) Applicants: Christoph Hahn; Rainer Forster; Vladimir Kobelev; David Muller; Lutz Manke

(72) Inventors: Christoph Hahn; Rainer Forster; Vladimir Kobelev; David Muller; Lutz Manke

(73) Assignee: MUHR UND BENDER KG

Trial Number:

IPR2022-00278 filed Dec. 22, 2021

Inter Partes Review Certificate for:

Patent No.: 9,868,330
Issued: Jan. 16, 2018
Appl. No.: 14/905,840
Filed: Jan. 18, 2016

The results of IPR2022-00278 are reflected in this inter partes review certificate under 35 U.S.C. 318(b).

INTER PARTES REVIEW CERTIFICATE
U.S. Patent 9,868,330 K1
Trial No. IPR2022-00278
Certificate Issued Sep. 4, 2025

AS A RESULT OF THE INTER PARTES REVIEW PROCEEDING, IT HAS BEEN DETERMINED THAT:

Claims 1-5, 8, 10-15 and 17 are cancelled.

\* \* \* \* \*